Patented July 20, 1954

2,684,368

UNITED STATES PATENT OFFICE 2,684,368

BASIC ESTERS OF SUBSTITUTED THIENYL ACETIC ACIDS

Frederick Leonard, Jackson Heights, N. Y., assignor to Warner-Hudnut, Inc., New York, N. Y., a corporation of Delaware No Drawing. Application July 21, 1951,
Serial No. 238,030

4 Claims. (Cl. 260—293.4)

This invention relates to new compounds of pharmaceutical value, particularly as antispasmodics.

In accordance with my invention there are provided compounds having the general formula:

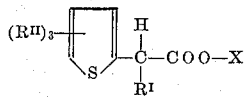

wherein $R^I$ denotes a cyclohexenyl or cyclopentenyl radical, $R^{II}$ denotes hydrogen, a short chain alkyl radical or halogen, which members may be the same or different, and X is a radical represented by the structure:

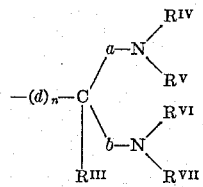

wherein $R^{III}$ is hydrogen or a short chain alkyl radical containing not over 4 carbon atoms; $a$, $b$ and $d$, which may be the same or different, denote an alkylene radical containing not over 6 carbon atoms and which may be straight chain or branched; $n$ denotes the numbers 0 or 1; $R^{IV}$ and $R^V$ which may be the same or different, denote alkyl radicals containing not over 4 carbon atoms, or together denote a polymethylene radical containing not over 5 carbon atoms, and which may be interrupted by an oxygen, sulfur or imino group; and $R^{VI}$ and $R^{VII}$, which may be the same or different, denote alkyl radicals containing not over 4 carbon atoms or together denote a polymethylene radical containing not over 5 carbon atoms and which may be interrupted by an oxygen, sulfur or imino group.

The compounds of my invention may be readily prepared by reacting a compound of the formula:

X—Hal wherein X is as above defined and Hal denotes halogen, with a compound of the formula

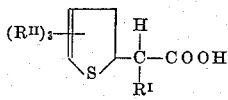

wherein $R^I$ and $R^{II}$ are as above defined, or with an alkali salt thereof; this reaction may be carried out readily under reflux in a suitable solvent such as isopropanol. My compounds may also be prepared by reacting under reflux and in a suitable solvent such as benzene, a compound of the formula:

X—OH with an acyl halide of the thienylacetic acids above illustrated. Another suitable method involves reacting a lower alkyl, e. g. methyl or ethyl, ester of the thienylacetic acids above illustrated with an alkanol of the formula X—OH under conditions accomplishing ester interchange and volatilization of the liberated lower alcohol, e. g. by heating the reactants in a solvent such as xylene at reflux temperatures. The thienylacetyl chloride from which the compounds of my invention are prepared may be conveniently obtained by treatment of the alpha-substituted thienylacetic acids with excess thionyl chloride under reflux in a suitable solvent such as dry benzene.

The free basic esters of my invention are water-insoluble liquids. Water-soluble salts may be formed by treating the free bases with acids such as hydrochloric acid, hydrobromic acid, sulfuric acid, tartaric acid, citric acid or succinic acid, or with suitable organic halides, e. g. alkyl halides such as methyl chloride or methyl bromide, aralkyl halides such as benzyl chloride or benzyl bromide or other organic halides such as thienylmethyl chloride.

The following example is illustrative of my invention.

*Example*

To a solution of 627 gms. (3.02 moles) of alpha-($\Delta^2$-cyclopentenyl)-2-thienylacetic acid in 1510 cc. of dry benzene, 395 gms. (3.32 moles) of thionyl chloride were added slowly, the mixture heated to boiling and refluxed for one hour. The solvent and excess thionyl chloride were removed under vacuum and the residue distilled at 3 mm. The fraction boiling at 114°–140° C. was collected and refractionated at 2.7 mm. to give 317 gms. of pure alpha-$\Delta^2$-cyclopentenyl)-2-thienylacetyl chloride, B. P. 121°–125° C., $n_D^{20}$ 1.555. Analysis gave the following results: Calculated for $C_{11}H_{11}ClOS$: C=58.29, H=4.89, Cl=15.65. Found: C=58.45, H=4.70, Cl=15.60.

To a solution of 17.1 gms. (0.075 moles) of alpha-($\Delta^2$-cyclopentenyl)-2-thienylacetyl chloride prepared as above described in 100 cc. of dry benzene was gradually added 15.2 gms. (0.075 moles) of 1,3-bis-(diethylamino)-2-propanol dissolved in 50 cc. of dry benzene; after the addition of the alcohol had been completed, the mixture was refluxed for 4 hours. The solvent was then removed in vacuo and the residue dissolved in 30 cc. of water. The resulting aqueous solution was covered with 50 cc. of ether and shaken with a solution of 8 gms. of sodium hydroxide in 12 cc. of water. The two layers were separated, the aqueous phase extracted with 15 cc. of ether and the combined ether solutions washed with saturated sodium chloride solution. After drying over anhydrous potassium carbonate, the ethereal solution was concentrated in vacuo and the residue distilled. 13.56 grams of a fraction boiling at 77°–148° C. under 1 micron of pressure was collected.

The hydrochloride was made by adding 7 cc. of 4.92 N ethanolic HCl to a solution of the base in 100 cc. of 99% ethyl acetate. The salt crystallized after addition of 125 cc. of ether and chilling, M. P. 127.5°–129.5° C. This salt was purified by two recrystallizations carried out as follows: the solid was dissolved in 65–80 cc. of hot ethyl acetate and Skellysolve B added until the solution became turbid. On cooling, an oil deposited and the supernatant liquid was decanted. The supernatant liquid was reheated, 20 cc. of ethyl acetate added, and Skellysolve B again added to the appearance of turbidity. The hydrochloride crystallized, was filtered, and washed successively with a 1:1 mixture of ethyl acetate-Skellysolve B, Skellysolve B, and ether. A third recrystallization from 95 cc. of ethyl acetate and ether gave 8.82 gms. of analytically pure 1,3-bis-(diethylamino) - 2 - propyl alpha - ($\Delta^2$ - cyclopentenyl)-2-thienylacetate hydrochloride, M. P. 129.5°–130° C. Analysis gave the following results: Calculated for $C_{22}H_{37}ClN_2O_2S$: C=61.57, H=8.69. Found: C=61.33, H=8.67.

By substituting for the alpha-($\Delta^2$-cyclopentenyl)-2-thienylacetic acid in the above example, an equivalent amount of alpha - ($\Delta^2$ - cyclohexenyl)-2-thienylacetic acid, the compound 1,3-bis(diethylamino) - 2 - propyl alpha - ($\Delta^2$ - cyclohexenyl)-2-thienylacetate was obtained.

Other compounds within the scope of the present invention may be obtained by substituting suitable reactants in the procedure described in the above example. Such compounds include: 1,3 - bis - (N - piperidino) - 2 - propyl alpha- ($\Delta^2$ - cyclopentenyl) - 2 - thienylacetate, 1,3-bis-(diethylamino) - 2 - propyl alpha - ($\Delta^2$ - cyclopentenyl) - 3 - methyl - 2 - thienylacetate, 1,3- bis - (diethylamino) - 2 - propyl alpha - ($\Delta^2$-cyclohexenyl) - 4 - chloro - 2 - thienylacetate, 1,3 - bis - (dimethylamino) - 2 - propyl alpha- ($\Delta^2$ - cyclopentenyl) - 2 - thienylacetate, 1,3- bis - (di - isopropylamino) - 2 - propyl alpha- ($\Delta^2$ - cyclohexenyl) - 2 - thienylacetate, 4 - (diethylamino) - 2 - (diethylaminomethyl) - butyl alpha - ($\Delta^2$ - cyclopentenyl) - 2 - thienylacetate, 1 - (diethylamino) - 3 - (dimethylamino) - 2 - propyl alpha - ($\Delta^2$ - cyclopentenyl) - 2 - thienylacetate, 1,3 - bis - (N - morpholino) - 2 - propyl alpha - ($\Delta^2$ - cyclopentenyl) - 2 - thienylacetate, 1,3 - bis - (N - thiomorpholino) - 2 - propyl alpha - ($\Delta^2$ - cyclopentenyl) - 2 - thienylacetate, 1,3 - bis - (N - piperazino) - 2 - propyl alpha- ($\Delta^2$ - cyclohexenyl) - 2 - thienylacetate, as well as water soluble salts of these basic esters obtained in accordance with the foregoing disclosure.

Since certain changes may be made in the compounds described without departing from the scope of my invention, it is intended that all matter contained in the above description shall be interpreted as illustrative, and not in a limiting sense.

I claim:

1. A compound selected from the group consisting of compounds having the formula

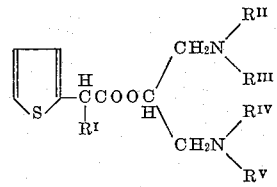

wherein $R^I$ is a member selected from the group consisting of cyclohexenyl and cyclopentenyl radicals; $R^{II}$ and $R^{III}$ are members selected from the group consisting of alkyl radicals containing from 1–3 carbon atoms and together with the nitrogen form cyclic members selected from the group consisting of piperidino, morpholino, thiomorpholino and piperazino radicals; and $R^{IV}$ and $R^V$ are members selected from the group consisting of alkyl radicals containing from 1–3 carbon atoms and together with the nitrogen form cyclic members selected from the group consisting of piperidino, morpholino, thiomorpholino and piperazino radicals; and salts thereof.

2. The compound 1,3 - bis - (diethylamino)- 2 - propyl alpha - ($\Delta^2$ - cyclopentenyl) - 2 - thienylacetate hydrochloride.

3. The compound 1,3 - bis - (diethylamino)- 2 - propyl alpha - ($\Delta^2$ - cyclohexenyl) - 2 - thienylacetate hydrochloride.

4. The compound 1,3 - bis - (N - piperidino)- 2 - propyl alpha - ($\Delta^2$ - cyclohexenyl) - 2 - thienylacetate.

References Cited in the file of this patent

UNITED STATES PATENTS

| Number | Name | Date |
|---|---|---|
| 2,533,002 | Feldkamp | Dec. 5, 1950 |
| 2,541,634 | Blicke | Feb. 13, 1951 |
| 2,561,385 | Leonard | July 24, 1951 |